United States Patent Office 2,731,357
Patented Jan. 17, 1956

2,731,357
COLOR STABILIZED WHITE PIGMENTED ETHYL CELLULOSE PLASTIC COMPOSITIONS

Albert B. Savage, Midland, Mich., assignor to The Dow Chemical Company, Midland, Mich., a corporation of Delaware No Drawing. Application July 15, 1954,
Serial No. 443,701

3 Claims. (Cl. 106—176)

This invention relates to white pigmented ethyl cellulose plastic compositions which exhibit a marked improvement in their whiteness retention after prolonged exposure to heat.

White pigmented ethyl cellulose plastic compositions are commonly used for making extruded or molded articles. It is common to find that the necessary exposure to heat in an extruder or in an injection molding machine contributes a yellow tinge to white pigmented ethyl cellulose, especially when viewed in light having ultraviolet components. No stabilizer is known which prevents such discoloration completely. It is especially true in the highly competitive field of molded plastics that, of several otherwise identical "white" articles, the one with the least combination of red, blue, green and yellow discoloration is the most acceptable.

It is an old practice to add blue pigments to white pigmented plastic compositions to "neutralize" the yellowing incident to prolonged heating. This has been unsatisfactory since it gives a grey, rather than a true white effect, and because any variation in the heat exposure time requires a comparable change in the blue pigment content of the composition to avoid under- or overcorrection for thermal yellowing.

In other fields where yellowing of white articles is a problem, as in the laundering of cotton white goods, there has come into widespread use a large number of organic compounds which are variously referred to as "white dyes" or as "optical bleaches." Such agents have the property of absorbing ultraviolet radiations and of emitting blue light under ultraviolet excitation.

Attempts have now been made to use various of the optical bleach materials to neutralize the yellow discoloration of white plastic compositions, but without general success. Thus, it is found that some optical bleach agents mask yellowness but produce objectionable redness. Others are wholly without effect in molded or extruded plastic compositions, possibly because they are unstable when heated or because many plastics effectively absorb ultraviolet radiations and these become unavailable to excite the optical bleach agent. It has become apparent that no optical bleach agent is universally useful to conceal the yellowing of heat fabricated organic plastics, and that, for any one plastic composition, it is unpredictable whether a particular optical bleach agent will be effective.

It is the principal object of this invention to provide a white pigmented ethyl cellulose composition of improved and lasting apparent whiteness which retains these characteristics when subjected to enough heat to discolor the ethyl cellulose.

According to the present invention the foregoing object is realized by incorporating in a white pigmented ethyl cellulose composition from as little as 0.2 part per million up to 10 per cent by weight of 4,4'-bis(3,4-methylenedioxybenzamido)-stilbene-2,2'-disulfonic acid, or an alkali metal, ammonium or alkylamine salt thereof. The useful acid has the formula

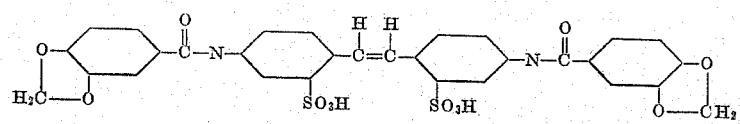

The preparation of this compound is described in Example I of British patent specification No. 660,868, published November 14, 1951. The most generally practical concentration of the optical bleach agent in the white pigmented ethyl cellulose compositions is from 0.01 to 0.5 per cent, though much smaller amounts are effective for compositions with low thermal exposure and larger amounts are not objectionable.

It has been found, as well, that such closely related structures as

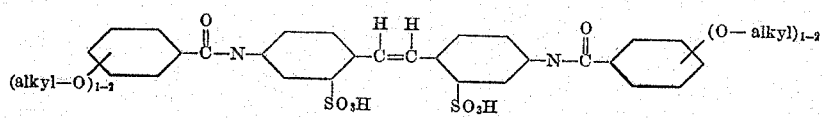

are ineffective as optical bleaches in white pigmented ethyl cellulose compositions, as are the hydroxycoumarine compounds, benzthiazole compounds and triazine compounds which have been used as optical bleaches in laundering.

The methylene dioxy compound which is useful here has been tested in other plastic formulations, including white pigmented polystyrene, and the results have been disappointing, since thermally induced yellowing is not concealed by the agent when molded articles are viewed in sunlight.

The ethyl cellulose compositions of the invention may be made in any of several ways. It is convenient, for example, to add a solution of the bleach to an aqueous slurry of freshly precipitated and washed ethyl cellulose, and then to steam off the solvent, and to dry the slurry to deposit the bleach on the ethyl cellulose before adding pigment and plasticizer. The bleach may also be dispersed in water, suitably with the aid of a wetting or emulsifying agent, and stirred or sprayed into a slurry of water-wet ethyl cellulose, which may then be dried, plasticized and pigmented. Alternatively, the bleach may be dry-mixed with the ethyl cellulose, suitably being blended first with the pigment and then added to the compounding mill wherein the ethyl cellulose and plasticizer are being mixed.

In evaluating the white pigmented compositions, a standard blend of pigment, plasticizer and ethyl cellulose is prepared, with or without bleach, and extruded, cut into chips, and injection molded flat plates are made using two different holding periods in the tunnel of the molding machine, some of the plastic composition being held 5 minutes beyond the normal dwell time in the hot tunnel before being injected into the mold, and some of the composition being held in the hot tunnel for 15 minutes longer than the normal dwell period before injection. The extruded and cut chips and the molded articles are measured for per cent reflectance at various wavelengths in a spectrophotometer. They are also tested for the quality of reflected light in a reflectometer which shows the relative intensity of deviation from pure white, measured as red, blue, yellow and green reflection from the sample, using a standard mixed light source.

The following specific examples illustrate the practice of the invention:

EXAMPLE 1

Two grams of 4,4'-bis(3,4-methylenedioxybenzamido)-stilbene-2,2'-disulfonic acid was dissolved in about 500 ml. of an 80–20 volume mixture of toluene and ethanol. This solution was added to a hot aqueous slurry of freshly precipitated ethyl cellulose containing about 2300 grams of the cellulose ether. The toluene and ethanol were steamed away from the ethyl cellulose, and the latter was dried in air at about 80° C. A white pigmented plastic mix was prepared consisting of 81 per cent by weight of the ethyl cellulose-bleach mixture, 3 per cent of titanium dioxide ("RBH 8205") and 16 per cent of di-tertiaryoctyl diphenyloxide. The mix was extruded, cut into molding chips, and tested in comparison with other similarly plasticized and pigmented samples of the same ethyl cellulose containing no optical bleach agent, as well as samples containing 0.1 per cent of 4,4'-bis(2-methoxybenzamido)stilbene-2,2'-disulfonic acid. The comparative results are:

Table 1

| Bleach Agent | Appearance, Daylight | | | Hunter Reflectometer Values—Original Chips | | |
|---|---|---|---|---|---|---|
| | Orig. Chips | Heated | | Reflectance reading | "a" value (+red, −green) | "b" value (+yellow, −blue) |
| | | 5 min. | 15 min. | | | |
| None | LC | C | C | 79.4 | −0.8 | +7.1 |
| 3,4-methylene dioxy | W | W | LC | 78.4 | +0.3 | +4.2 |
| 2-methoxy | LC | LC | C | 78.6 | −0.9 | +7.5 |

NOTE.—W=white, LC=light cream, C=cream color.

It is seen that the methylene dioxy compound not only gives an apparent lighter color when viewed in daylight but also its compositions have none of the green and much less of the yellow factors than the control composition or the one containing the methoxy compound.

EXAMPLE 2

Freshly precipitated ethyl cellulose was sprayed with an aqueous dispersion of one of the same bleach agents, dried, pigmented with titanium dioxide ("Titanox LOCR") and plasticized to give the same formulation as in Example 1. Another such formulation was made by the "dry mix" procedure in which the bleach agent and pigment were mixed together and milled into the ethyl cellulose and plasticizer. Each formulation was extruded, cut into molding chips, and subjected to the previously described tests, using both the Hunter Reflectometer and a General Electric recording Spectrophotometer. The results are reported in Tables 2 and 3.

Table 2

| Test No. | Bleach Agent | How Added | Appearance, daylight | | | Hunter Reflectometer Values | | | | | | | | |
|---|---|---|---|---|---|---|---|---|---|---|---|---|---|---|
| | | | Orig. Chip | Heated | | Original Chip | | | Heated 5 min. | | | Heated 15 min. | | |
| | | | | 5 min. | 15 min. | Reading | "a" | "b" | Reading | "a" | "b" | Reading | "a" | "b" |
| 4797 | None | | C | C | C | 79.4 | −0.9 | +6.3 | 74.9 | −0.8 | +7.4 | 66.3 | −0.4 | +8.7 |
| 4798 | 3,4-methylenedioxy | spray | W | W | W | 82.0 | +0.3 | +2.6 | 77.9 | 0.0 | +4.5 | 70.8 | −0.2 | +7.3 |
| 4799 | 2-methoxy | do | C | C | DC | 80.4 | −1.0 | +6.4 | 76.0 | −1.0 | +7.9 | 68.7 | −0.8 | +9.0 |
| 4800 | 3,4-methylenedioxy | dry mix | W | W | W | 80.2 | 0.0 | +3.2 | 78.3 | −0.2 | +4.4 | 75.9 | −0.6 | +5.8 |

NOTE.—W=white, LC=light cream, C=cream color, DC=dark cream.

Table 3

ORIGINAL CHIPS

| Test No. | Percent reflectance at indicated wavelength in millimicrons | | | | | | | | | |
|---|---|---|---|---|---|---|---|---|---|---|
| | 400 | 420 | 440 | 460 | 480 | 500 | 550 | 600 | 650 | 700 |
| 4797 | 65 | 72 | 76 | 77 | 78 | 79 | 82 | 85 | 88 | 89 |
| 4798 | 80 | 78 | 80 | 80 | 82 | 82 | 84 | 87 | 90 | 91 |
| 4799 | 62 | 71 | 77 | 78 | 80 | 81 | 83 | 86 | 89 | 90 |
| 4800 | 79 | 77 | 77 | 78 | 79 | 81 | 83 | 86 | 89 | 89 |

HEATED 5 MIN

| 4797 | 60 | 67 | 71 | 73 | 74 | 75 | 78 | 82 | 85 | 86 |
| 4798 | 74 | 73 | 74 | 75 | 77 | 78 | 81 | 84 | 88 | 88 |
| 4799 | 57 | 65 | 71 | 73 | 75 | 77 | 79 | 83 | 86 | 87 |
| 4800 | 75 | 74 | 75 | 75 | 77 | 78 | 81 | 84 | 87 | 88 |

HEATED 15 MIN

| 4797 | 53 | 58 | 62 | 63 | 65 | 67 | 70 | 74 | 78 | 80 |
| 4798 | 65 | 65 | 67 | 68 | 69 | 71 | 74 | 78 | 82 | 84 |
| 4799 | 50 | 57 | 63 | 64 | 67 | 68 | 72 | 76 | 79 | 81 |
| 4800 | 72 | 71 | 72 | 72 | 73 | 75 | 78 | 82 | 85 | 86 |

It is noted from the two preceding tables that the methylene dioxy compound gives the otherwise identical compositions much less of the green and yellow values when viewed in mixed light, and significantly higher reflectance values at each of the shorter wavelengths, than are obtained with the corresponding methoxy compound or when no "optical bleach" agent is present. The methoxy compound, for example, gives reflectance values at short wavelengths which are lower, equal to, or at best only 1 or 2 percentage points higher than those of the control samples, and would appear to be of no utility in white pigmented ethyl cellulose compositions.

The invention has been illustrated with compositions in which the pigment is titanium dioxide, but is not so-limited. For special uses, ethyl cellulose compositions are sometimes whitened with such agents as zinc oxide or calcium carbonate. No such pigment interferes with the optical bleaching effect of the methylene dioxy compound of this invention in white pigmented ethyl cellulose compositions.

To illustrate the specificity of the present invention, the methylene dioxy compound here found useful has been incorporated in white pigmented polystyrene compositions but without showing any "bleaching" effect, i. e., any decrease in yellowness or increase in "whiteness."

I claim:

1. A white pigmented ethyl cellulose plastic composition comprising ethyl cellulose, a white pigment therefor and from 0.2 parts per million up to 10 per cent, based on the weight of ethyl cellulose, of 4,4'-bis(3,4-methylenedioxybenzamido)stilbene-2,2'-disulfonic acid.

2. The composition claimed in claim 1, wherein from 0.01 to 0.5 per cent of said disulfonic acid compound is present.

3. The composition claimed in claim 2, wherein the white pigment is essentially titanium dioxide.

No references cited.